(12) United States Patent
Nieberlein et al.

(10) Patent No.: US 9,595,883 B2
(45) Date of Patent: Mar. 14, 2017

(54) METHOD FOR CONTROLLING A VIENNA RECTIFIER

(71) Applicant: SIEMENS AKTIENGESELLSCHAFT, München (DE)

(72) Inventors: Klaus Nieberlein, Nürnberg (DE); Hubert Schierling, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/065,296

(22) Filed: Mar. 9, 2016

(65) Prior Publication Data

US 2016/0268920 A1    Sep. 15, 2016

(30) Foreign Application Priority Data

Mar. 9, 2015 (EP) .................................... 15158195

(51) Int. Cl.
*H02M 7/06* (2006.01)
*H02M 1/42* (2007.01)
(Continued)

(52) U.S. Cl.
CPC ........... *H02M 7/06* (2013.01); *H02M 1/4216* (2013.01); *H02M 7/219* (2013.01); *H02M 2007/53876* (2013.01)

(58) Field of Classification Search
CPC ......... H02M 2007/53876; H02M 7/06; H02M 7/487; H02M 1/4216; H02M 7/217;
(Continued)

(56) References Cited

U.S. PATENT DOCUMENTS 6,850,424 B2    2/2005    Baudelot et al.
6,862,163 B2    3/2005    Schierling et al.
(Continued)

FOREIGN PATENT DOCUMENTS

EP    0660498 A2    6/1995
EP    2131480 A2    12/2009

OTHER PUBLICATIONS

Wenxi Yao et al: "A Novel SVPWM Scheme for Vienna Rectifier without Current Distortion at Current Zero-crossing Point"; 2014 IEEE 23rd International Symposium on Industrial Electronics ISIE; pp. 2349-2353; XP032624063; DOI: 10.1109/ISIE.2014.6864986; 2015Q21864.

*Primary Examiner* — Adolf Berhane
*Assistant Examiner* — Henry Lee, III
(74) *Attorney, Agent, or Firm* — Henry M. Feiereisen LLC

(57) ABSTRACT

The invention is an optimized method for controlling a Vienna rectifier (10), comprising the following steps:
  on the basis of a characteristic vector—vector—a block (B1-B6) is selected from a plurality of blocks (B1-B6) in a space vector switching diagram for the Vienna rectifier (10),
  depending on the block (B1-B6) selected and its position in the space vector switching diagram, the vector is rotated through an offset angle according to the position of the block (B1-B6) in the space vector switching diagram, wherein the resulting angle of the rotated vector continues to be used as the normalized phase angle ($\Theta$) and the block (B1) in which the rotated vector falls is designated the first block (B1),
  on the basis of the normalized phase angle ($\Theta$), an upper or lower half of the first block (B1) is selected,
(Continued)

on the basis of the absolute value of the normalized phase angle (Θ) and the vector, one of three area sections (F1-F3) of the block (B1) is selected in the first block (B1), on the basis of the area section (F1-F3) determined, subvectors (k0, k1, k2) corresponding in total to the rotated vector are determined, on the basis of the subvectors (k0, k1, k2) determined, switching times (t0, t1, t2) for triggering the switches (S1-S3) are determined.

11 Claims, 14 Drawing Sheets

(51) Int. Cl.
  *H02M 7/219* (2006.01)
  *H02M 7/5387* (2007.01)
(58) Field of Classification Search
  CPC .... H02M 7/219; H02M 7/53873; H02M 1/12; H02M 1/4233; H02M 7/2173; H02M 1/126; H02M 2001/4283; H02M 7/2176
  See application file for complete search history.

(56) References Cited

U.S. PATENT DOCUMENTS

| | | | |
|---|---|---|---|
| 6,914,397 B2 | 7/2005 | Schierling | |
| 7,301,736 B2 | 11/2007 | Schierling | |
| 7,394,627 B2 | 7/2008 | Schierling et al. | |
| 7,489,124 B2 | 2/2009 | Schierling | |
| 7,529,111 B2 | 5/2009 | Schierling | |
| 7,622,886 B2 | 11/2009 | Schierling | |
| 7,652,585 B2 | 1/2010 | Schierling | |
| 7,825,533 B2 | 11/2010 | Schierling | |
| 8,743,572 B2 | 6/2014 | Schierling et al. | |
| 9,146,166 B2 | 9/2015 | Köpken et al. | |
| 2003/0128563 A1* | 7/2003 | Rojas Romero | H02M 1/4216 363/89 |
| 2008/0049460 A1* | 2/2008 | Mohan | H02M 5/271 363/34 |
| 2008/0259663 A1* | 10/2008 | Perkinson | H02M 1/4216 363/126 |
| 2008/0310202 A1 | 12/2008 | Schierling | |
| 2009/0040800 A1* | 2/2009 | Sonnaillon | H02M 7/219 363/89 |
| 2011/0043082 A1 | 2/2011 | Billmann et al. | |
| 2012/0140537 A1* | 6/2012 | Fattal | H02M 1/4216 363/126 |
| 2012/0257427 A1* | 10/2012 | Fattal | H02M 7/066 363/84 |
| 2013/0083571 A1* | 4/2013 | Pu | H02M 1/126 363/44 |
| 2013/0215654 A1* | 8/2013 | Yan | H02M 7/23 363/69 |
| 2014/0003099 A1 | 1/2014 | Dillig et al. | |
| 2014/0254222 A1 | 9/2014 | Nieberlein | |
| 2014/0369091 A1 | 12/2014 | Bauer et al. | |
| 2015/0365021 A1 | 12/2015 | Schierling | |

* cited by examiner

Title: METHOD FOR CONTROLLING A VIENNA RECTIFIER

CROSS-REFERENCES TO RELATED APPLICATIONS

This application claims the priority of European Patent Application Ser. No. 15158195, filed Mar. 9, 2015, pursuant to 35 U.S.C. 119(a)-(d), the content of which is incorporated herein by reference in its entirety as if fully set forth herein.

BACKGROUND OF THE INVENTION

The invention relates to a method for controlling a Vienna rectifier, also known as a three-phase three-level PWM rectifier. A description of the Vienna rectifier may be found e.g. in EP 0 660 498 A2.

The following discussion of related art is provided to assist the reader in understanding the advantages of the invention, and is not to be construed as an admission that this related art is prior art to this invention.

In contrast to conventional six-pulse bridge circuits (B6) used for rectifying 3-phase alternating current, a Vienna rectifier is known to be characterized by a significantly lower harmonic content on the AC voltage side. Because of an approximately sinusoidal current waveform, a smaller line filter is sufficient particularly at higher powers and less space is therefore required for the Vienna rectifier. This must be set against a comparatively complex/costly electronic control circuit which controls the Vienna rectifier by pulse width modulation (PWM).

For controlling a Vienna rectifier or an active rectifier in general—hereinafter referred to as a rectifier for short—a pulse pattern for controlling a power semiconductor is required. A preceding control system outputs a voltage vector having an angle and an amplitude. Just as in space vector modulation, sectors can be defined in which the voltage vector can move. Although the switching states at the vertices of the respective sectors are known, the switching times must now also be determined for the voltage vector. In addition, for the relevant voltage vector another associated subsector must be determined, since, compared to space vector modulation, in the case of the two-level inverter there are not only six, but a total of 24 sectors.

It would therefore be desirable and advantageous to obviate prior art shortcomings and to provide an improved method for controlling the Vienna rectifier, i.e. a particularly efficient trigger set. The method with improved efficiency may be implemented in software, firmware or a combination of software and firmware, being as resource-saving as possible and resulting in a comparatively minimal execution time of the method running continuously in a fixed time pattern in each clock cycle.

SUMMARY OF THE INVENTION

According to one aspect of the present invention, a method for controlling a Vienna rectifier having three controllable switches, particularly controllable switches in the form of power semiconductors, the following steps are provided for this purpose: on the basis of a characteristic vector, hereinafter referred to merely as a vector, e.g. a voltage vector output by a control system for controlling the Vienna rectifier, a block is selected from a plurality of blocks, here six blocks, in a space vector switching diagram for the Vienna rectifier. Depending on the block selected and its position in the space vector switching diagram, the vector is rotated through an offset angle corresponding to the position of the block in the space vector switching diagram. The resulting angle of the rotated vector is additionally used as the normalized phase angle $\ominus$ and the block in which the rotated vector falls is termed the first block for differentiation purposes. In another method step, an upper or lower half of the first block is selected on the basis of the normalized phase angle $\ominus$. In a further method step, one of three area sections of the first block is selected on the basis of the absolute value of the normalized phase angle $\ominus$ and of the rotated vector in the first block. In another method step, subvectors k0, k1, k2 corresponding in total to the rotated vector are determined on the basis of the area section determined. Finally, in another further method step, switching times t0, t1, t2 for triggering the controllable switches of the Vienna rectifier are determined on the basis of the subvectors k0, k1, k2.

The method described here and in the following forms the basis for an algorithm for controlling the Vienna rectifier, namely for triggering the three controllable switches incorporated therein. According to the usual technical terminology, such an algorithm or its implementation in software or firmware or software and firmware is also known as a trigger set. Above all, fast execution times are critical for the implementation of the method. The advantage of the invention accordingly resides primarily in a simplification allowing such rapid execution times, particularly a simplification of the calculations necessary for controlling the Vienna rectifier.

Instead of a block of, for example, six blocks in which the characteristic vector, e.g. the voltage vector output by a control system, could fall, by using the normalized phase angle $\ominus$ and the rotated vector a single block is produced to which the further calculations can relate, namely the block designated the first block for differentiation purposes. This is already a first significant simplification.

The fact that an upper or lower half of the first block (B1) is selected on the basis of the normalized phase angle $\ominus$ results in another simplification, because it is then possible to proceed thereafter from the absolute value of the normalized phase angle $\ominus$ without it being necessary discriminate depending on the sign of the normalized phase angle $\ominus$.

By selecting one of three area sections of the first block on the basis of the absolute value of the normalized phase angle $\ominus$ and the rotated vector in the first block, cases can be discriminated for each of the three area sections in respect of a maximally simple, i.e. fast-compute determination of subvectors k0, k1, k2 corresponding in total to the rotated vector.

Finally, switching times t0, t1, t2 for triggering the controllable switches are determined on the basis of the determined subvectors k0, k1, k2.

According to an advantageous feature of the present invention, a direction of rotation may be defined for each sector of the space vector switching diagram. To select a direction of rotation for triggering the switches, in the block in which the characteristic vector falls, depending on the upper or lower half selected in the first block, the upper or lower half thereof and, depending on the area section selected in the first block, one of three sectors is selected according to the underlying space vector switching diagram. Such a defined use of directions of rotation ensures that for each switching activity, just one state of one of the three controllable switches is changed in each case. This successfully minimizes switching losses.

According to another advantageous feature of the present invention, the switching time t0 of a zero vector k0 may be halved and one of the controllable switches may be triggered according to the halved switching time t0 both at the start and at the end of each clock cycle T, thereby advantageously producing the situation that each clock cycle T ends with the switching state with which it began.

According to another advantageous feature of the present invention, the switching times t0, t1, t2 determined may be halved and the halved switching times t0, t1, t2 may be distributed over a first half of each clock cycle T in a first sequence and over a second half of the respective clock cycle T in a second sequence which is the reverse of the first sequence, thereby advantageously reducing a voltage difference between two DC-link capacitors together constituting a DC link.

According to another advantageous feature of the present invention, resulting in a modified algorithm for implementing the method, instead of the voltage vector output by a control system, a current vector according to a power system supplying the Vienna rectifier may be used as the characteristic vector. When using the voltage vectors output by a control system as characteristic vectors, it can happen that an output voltage vector would result in a switch setting that cannot be implemented by the Vienna rectifier having only three controllable switches. The advantage of using the current vector is that such impermissible switch settings are eliminated.

When using the current vector as the characteristic vector, depending on whether the rotated vector falls in an outer, middle or inner block sector, limiting the subvectors k0, k1, k2 determined to the area of the respective block sector provides a particularly simple means of determining the subvectors k0, k1, k2. The fact that the block sectors are equilateral triangles simplifies the determining of the subvectors k0, k1, k2.

According to another advantageous feature of the present invention, using the current vector as the characteristic vector enables a particularly simple determination of a direction of rotation on which control of the switches is based by defining at least one direction of rotation for each sector of the space vector switching diagram and numbering the sectors of the space vector switching diagram according to a predefined numbering sequence (double spiral numbering sequence). One of the sectors and the direction of rotation defined there are selected according to the following scheme: first, a predefined numerical value is determined for the block in which the characteristic vector falls. To this is added a predefined first or second summand depending on the sign of the normalized phase angle $\ominus$. To this sum is added a predefined third, fourth or fifth summand depending on the respective block sector. The selection of the sector determining the respective direction of rotation is therefore reduced to simple additions, moreover to additions of whole positive integers.

According to another advantageous feature of the present invention, to balance an output-side DC-link voltage that can be tapped off via two series-connected DC-link capacitors of the Vienna rectifier, a voltage dropped across each DC-link capacitor may advantageously be determined, that the voltage values determined are fed to a controller and that the controller influences the switching times t0, t1, t2, in particular the switching time t0 of a zero vector k0, in order to balance the DC-link voltage. This possibility of DC-link voltage balancing is also advantageous irrespective of whether a voltage vector output by the control system or the current vector is used as the characteristic vector.

According to another aspect of the invention, a control system, a microcontroller or the like, operates according to the method aforedescribed. The invention is preferably implemented in software. The invention is therefore, on the one hand, also a computer program comprising computer-executable program code instructions and, on the other hand, a storage medium containing such a computer program, i.e. a computer program product having program code, and lastly also a control device or a drive system in whose memory such a computer program is loaded or can be loaded as means for carrying out the method and its embodiments.

Such a computer program is an implementation of the method for controlling the Vienna rectifier in software. Instead of such a computer program comprising individual program code instructions, the method described here and in the following can also be implemented in the form of firmware. It will be clear to a person skilled in the art that, instead of an implementation of the method in software, there is always the possibility of implementing it also in firmware or in firmware and software or in firmware and hardware. For the description presented here, it should therefore be understood that the term software and the terms computer program and algorithm also encompass other implementation possibilities, namely in particular an implementation in firmware or in firmware and software or in firmware and hardware.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
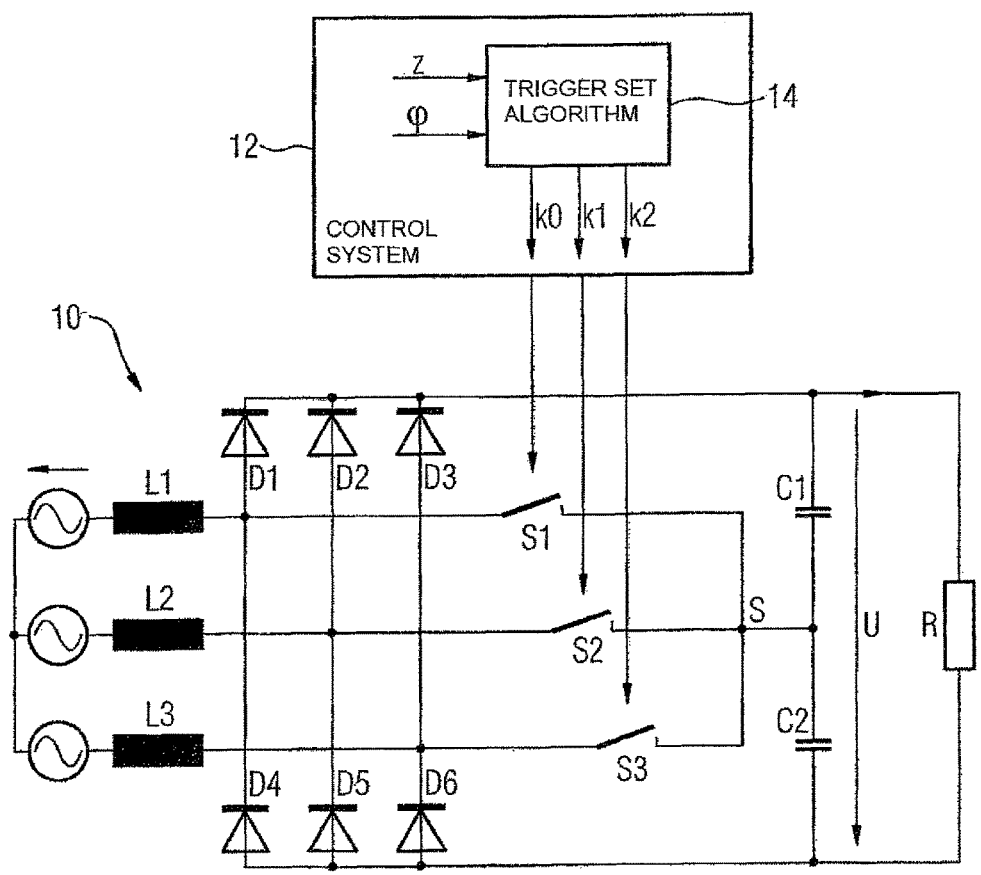
FIG. 1 shows a Vienna rectifier as a special embodiment of a three-level inverter having a control system designed for the control thereof.
Figure 2:
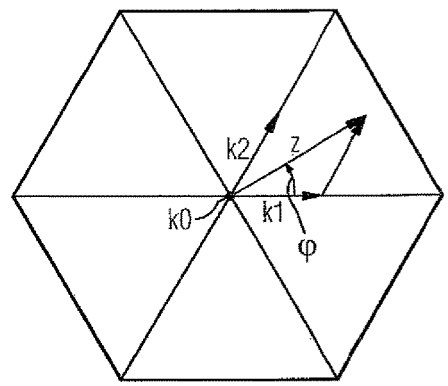
FIG. 2 shows a so-called space vector switching diagram of a two-level inverter.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a diagram of a Vienna rectifier 10. It is supplied from a three-phase system comprising the phases L1, L2, L3 and delivering the associated phase currents $I_{L1}$, $I_{L2}$, $I_{L3}$ at the respective line frequency f, e.g. 50 Hz. The upper and lower bridge sections each have three diodes D1, D2, D3; D4, D5, D6. Three controllable switches S1, S2, S3—usually electronic switches S1-S3 in the form of power semiconductors—connect the phases L1, L2, L3 in a switchable manner to a star point S and are accordingly also sometimes termed star point switches S1-S3. On the output side, the Vienna rectifier 10, hereinafter also termed rectifier 10 for short, has a DC-link comprising two series-connected DC-link capacitors C1, C2, wherein a center tap between the two DC-link capacitors C1, C2 is connected to the star point S. A voltage U available for supplying a connected load can be tapped off via the DC link (across the DC-link capacitors C1, C2).

For obtaining a desired output voltage U, only the switch settings of the star point switches S1-S3 are controllable. To control the star point switches S1-S3, a control system 12 is provided having a trigger set algorithm 14 implemented there or independently of the control system 12 in software, firmware or software and firmware. The control system 12 having the trigger set algorithm 14 or the control system 12 and the trigger set algorithm 14 are implemented e.g. in the form of one microcontroller or of a microcontroller in each case.

Figure 3:
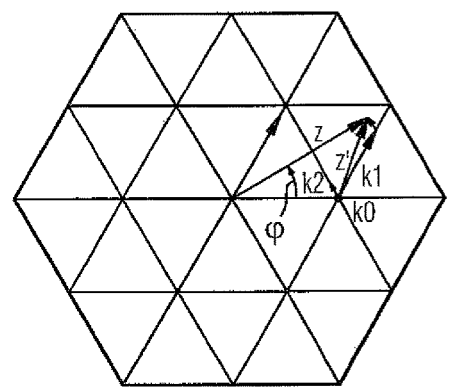
FIG. 3 shows a space vector switching diagram of a three-level inverter.

For a desired output voltage U, the control system 12 outputs a voltage vector z having an absolute value Z and a phase angle $\phi$ (see e.g. FIG. 3). On the basis of the voltage vector z, the trigger set algorithm 14 determines the switching times t0, t1, t2 for controlling the star point switches S1-S3. The control system 12 triggers the star point switches S1-S3 according to said switching times t0, t1, t2.

Figure 4:
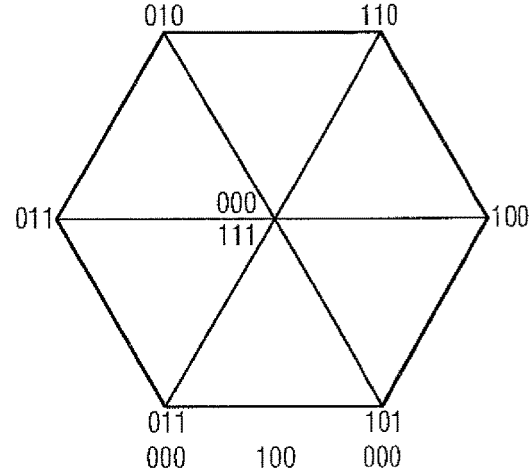
FIG. 4 shows switching states of a two-level inverter.
Figure 5:
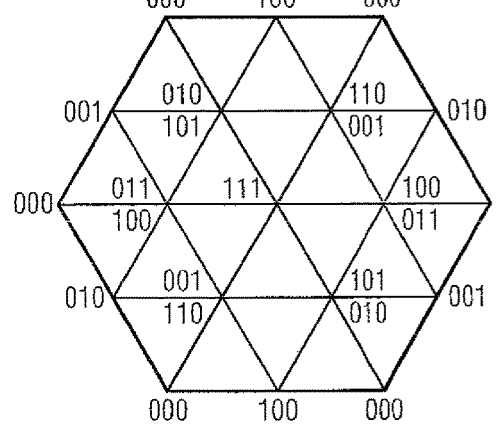
FIG. 5 shows switching states of a three-level inverter.

The illustrations in FIG. 2, FIG. 3, FIG. 4 and FIG. 5 show, by way of comparison, so-called space vector switching diagrams of a two-level inverter (FIG. 2, FIG. 4) and of a three-level inverter (FIG. 3, FIG. 5). The Vienna rectifier 10 is a three-level inverter having a limited number of controllable switches, namely the star point switches S1-S3. The space vector switching diagram of the two-level inverter can be seen to comprise six sectors. The space vector switching diagram of the Vienna rectifier 10 comprises the 26 sectors of a three-level inverter. The two-level inverter has a single zero point (in the center of the space vector switching diagram) with two zero vectors ("000", "111") and a total of eight states (FIG. 4). The three-level inverter has six zero points each with two zero vectors and can assume a total of 48 states (FIG. 5). Because it only has three controllable switches S1-S3, the Vienna rectifier 10 has fewer actually settable states. In fact, precisely eight states can be set. The specified switching states of the Vienna rectifier 10 as shown in FIG. 5 relate, in the usual notation, to the three phases L1, L2, L3, so that "000", for example, means that all the star point switches S1-S3 are closed, whereas a "1" in the switching state would mean a conducting diode D1-D3 in the upper bridge section and a "–1" would mean a conducting diode D4-D6 in the lower bridge section.

Figure 6:
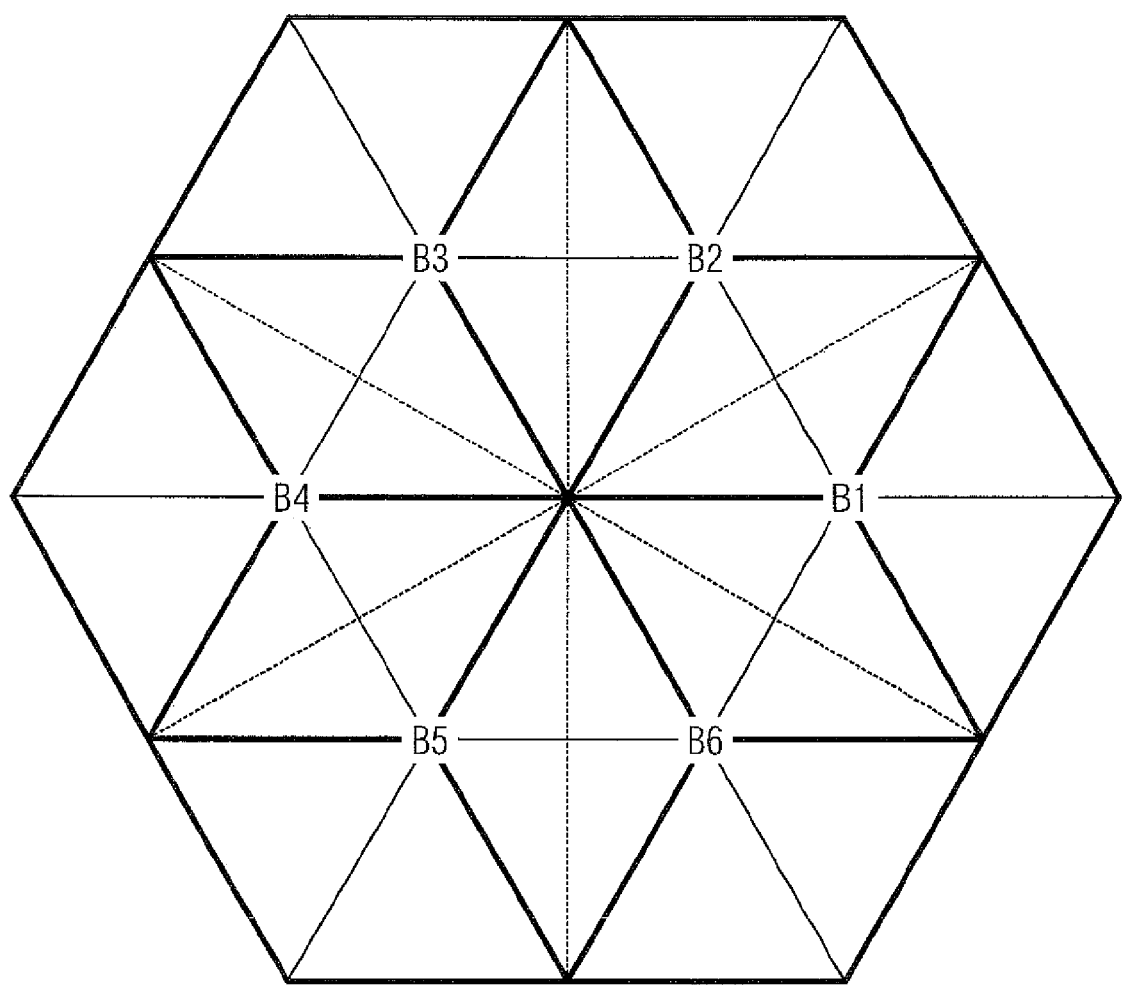
FIG. 6 shows the space vector switching diagram of the three-level inverter subdivided into symmetrical blocks.

The diagram in FIG. 6 shows that the space vector switching diagram of the three-level inverter can be subdivided into six partially overlapping blocks B1-B6, i.e. a first block B1, a second block B2, etc. A zero point/zero vector forms the central point of a block B1-B6. All the blocks B1-B6 are basically identical and every block B1-B6 can be rotated to every other block B1-B6 by rotating it through an appropriate angle. Therefore, each voltage vector z output by the control system 12 can be calculated using identical formulas.

Shown below are the calculations performed continuously and automatically by means of the trigger set algorithm 14 on the basis of the first block B1. If the voltage vector z output by the control system 12 falls in one of the other blocks B2-B6, the vector z is rotated through a particular angle, e.g. –60°, –120° etc., so that it eventually falls in said first block B1.

For this purpose an angle (offset angle) required for the respective rotation is subtracted from the phase angle $\phi$ of the voltage vector z predefined by the control system 12 in each case (see e.g. FIG. 3):

| | | |
|---|---|---|
| 1st block B1: | 330° < $\phi$ < 30° | $\Theta = \phi$ if $\phi$ > 330°, otherwise $\Theta = \phi - 360°$ |
| 2nd block B2: | 30° < $\phi$ < 90° | $\Theta = \phi - 60°$ |
| 3rd block B3: | 90° < $\phi$ < 150° | $\Theta = \phi - 120°$ |
| 4th block B4: | 150° < $\phi$ < 210° | $\Theta = \phi - 180°$ |
| 5th block B5: | 210° < $\phi$ < 270° | $\Theta = \phi - 240°$ |
| 6th block B6: | 270° < $\phi$ < 330° | $\Theta = \phi - 300°$ |

As each block B1-B6 overlaps its adjacent blocks B1-B6, e.g. the first block B1 overlaps the subsequent second block B2 and the preceding sixth block B6, the average overlap is taken as the demarcation. The hereinafter also termed normalized phase angle $\Theta$ therefore always moves in a range –30°<$\Theta$<30°.

Figure 7:
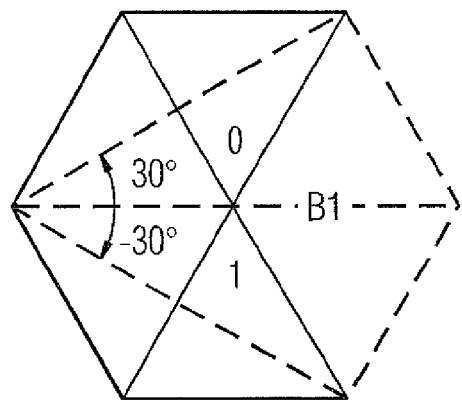
FIG. 7 shows one of the blocks according to FIG. 6 subdivided into a positive and a negative half.
Figure 8:
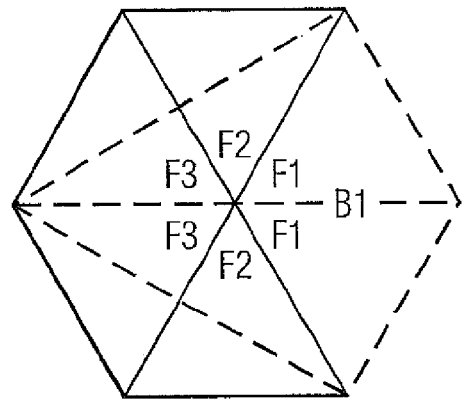
FIG. 8 shows one of the blocks according to FIG. 6 subdivided into 2× three opposite area sections each axially symmetrical with respect to one another.
Figure 9:
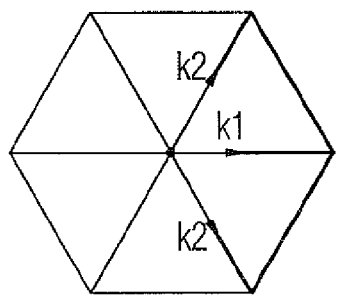
FIG. 9 shows so-called subvectors in the individual area sections according to FIG. 8, FIG. 10 and FIG. 11 show illustrations clarifying how the area section according to FIG. 8 in which a voltage vector output by the control system falls is determined.
Figure 9:
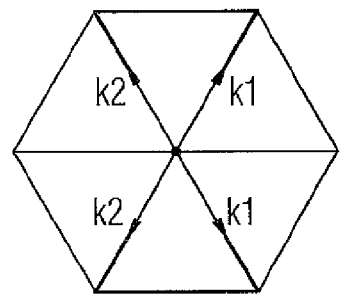
Figure 9:
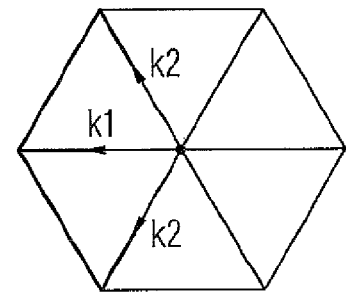

Taking the first block B1 as an example, the diagram in FIG. 7 shows that each block B1-B6 comprises a negative half "1" and a positive half "0". The diagram in FIG. 8 shows—again using the example of the first block B1—that each block B1-B6 comprises six area sections in the form of 2× three pairwise and axially symmetrically opposite area sections F1, F2, F3. The diagram in FIG. 9 shows labeling of the so-called subvectors k1, k2 for the individual sectors of a block B1-B6, here taking the first block B1 as an example. The bold boundary lines within the block B1 together with the subvectors k1, k2 marked above the boundary line designate the region of the block B1/sector which can be reached by varying the subvectors k1, k2.

Because of the axial symmetry (FIG. 7), the blocks B1-B6 or the first block B1 considered after rotation through the offset angle, for example, can be divided into two symmetrical halves, namely a first half of 30°>Θ>0° and a second half of −30°<Θ<0°. The axially symmetrically opposite area sections F1, F2, F3 (FIG. 8) belong either to the first half or to the second half of the block B1 in each case. As a result, formulas relating to the three area sections F1, F2, F3 of one half of the block B1, e.g. the first half with 30°>Θ>0°, are sufficient for implementing the trigger set algorithm 14. For the second half, instead of the angle Θ, the absolute value |Θ| thereof is used.

The next method step carried out by means of the trigger set algorithm 14 is the determining of the respective area section F1, F2, F3 in which the voltage vector z output by the control system 12 falls.

Figure 10:
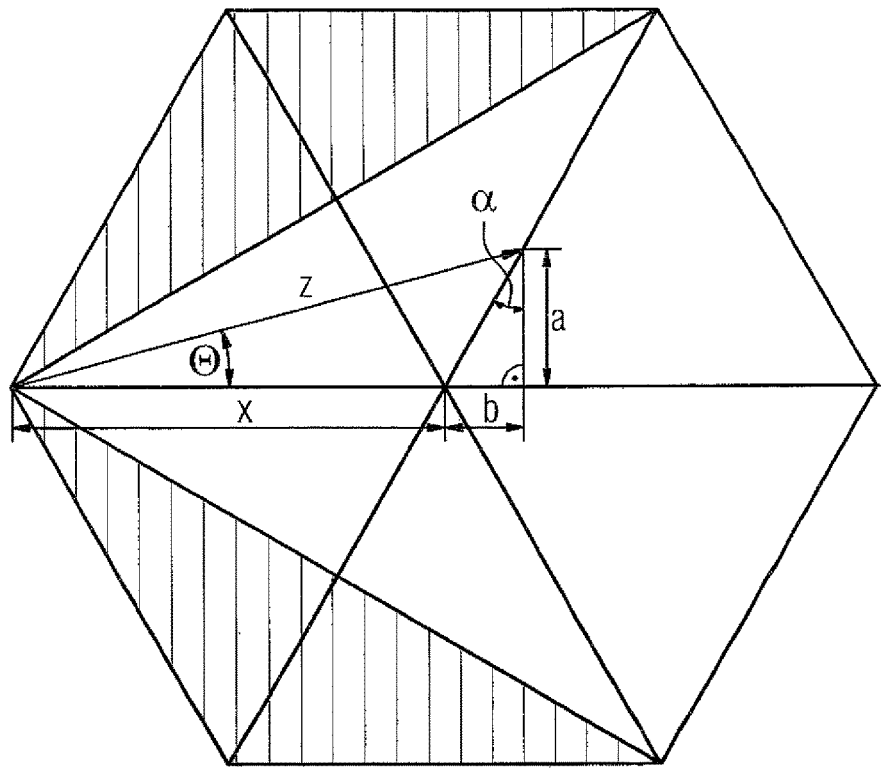
Figure 11:
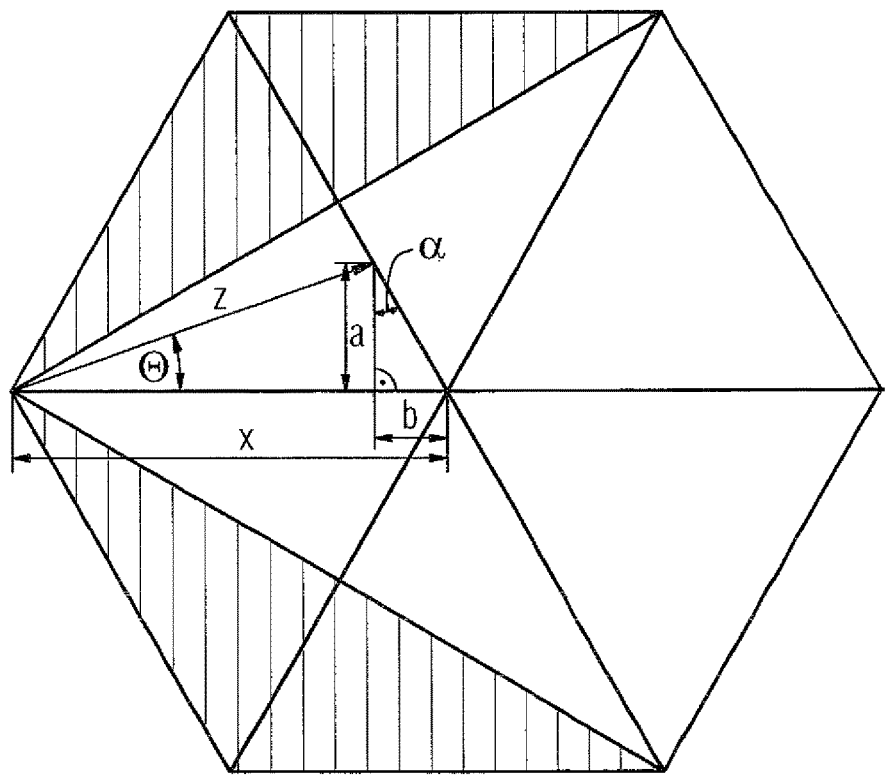

The diagram in FIG. 10 shows a voltage vector z falling in the first area section F1 (cf. FIG. 8). The diagram in FIG. 11 shows a voltage vector z falling in the third area section F3. A voltage vector z which falls in neither the first area section F1 nor the third area section F3 must necessarily fall in the remaining second area section F2.

From the voltage vector z and the normalized phase angle Θ, as shown in the diagrams in FIG. 10 and FIG. 11 it can be determined on the basis of the ratios applying in a right triangle whether the voltage vector z falls in the first or in the third area section F1, F3.

In the case of a voltage vector z lying in the first area section F1, $$|z| \geq x \cdot \cos(30°)/\sin(60°-|\Theta|)$$

applies, where |z| denotes the absolute value of the vector, i.e. its length.

In the case of a voltage vector z lying in a third area section F3

$$|z| \leq x \cdot \cos(30°)/\sin(60°+|\Theta|)$$

applies.

If neither of the two inequalities is fulfilled, the voltage vector z lies in the second area section F2.

Depending on the particular area section F1, F2, F3 in which the voltage vector output by the control system 12 lies, the subvectors k1, k2 (FIG. 9) can be determined. For this purpose—as in the case of determining the respective area section F1, F2, F3 (FIG. 10, FIG. 11)—the ratios in right triangles are likewise used, as shown in the diagrams in FIG. 12 and FIG. 13 for the first and third area section F1, F3 respectively.

Accordingly, in the case of a voltage vector z output by the control system 12 and lying in the first area section F1, the subvectors k1, k2 for obtaining said voltage vector z are produced having the following lengths:

$$|k1|=(z/\cos(30°))\cdot\sin(60°-|\Theta|)-1$$

$$|k2|=z\cdot\sin(|\Theta|)/\cos(30°)$$

and for a voltage vector z output by the control system 12 and lying in the third area section F3

$$|k1|=z\cdot\sin(|\Theta|)/\cos(30°)$$

$$|k2|=1-z\cdot\sin(60°+|\Theta|)/\cos(30°).$$

The length of the zero vector here also designated k0 can be calculated in each case as k0=1−k1−k2.

For the second area section F2 (not shown)

$$k1=1-z\cdot\sin(60°-|\Theta|)/\cos(30°)$$

$$k2=z\cdot\sin(60°+|\Theta|)/\cos(30°)$$

applies, and likewise $$k0=1-k1-k2.$$

Figure 14:
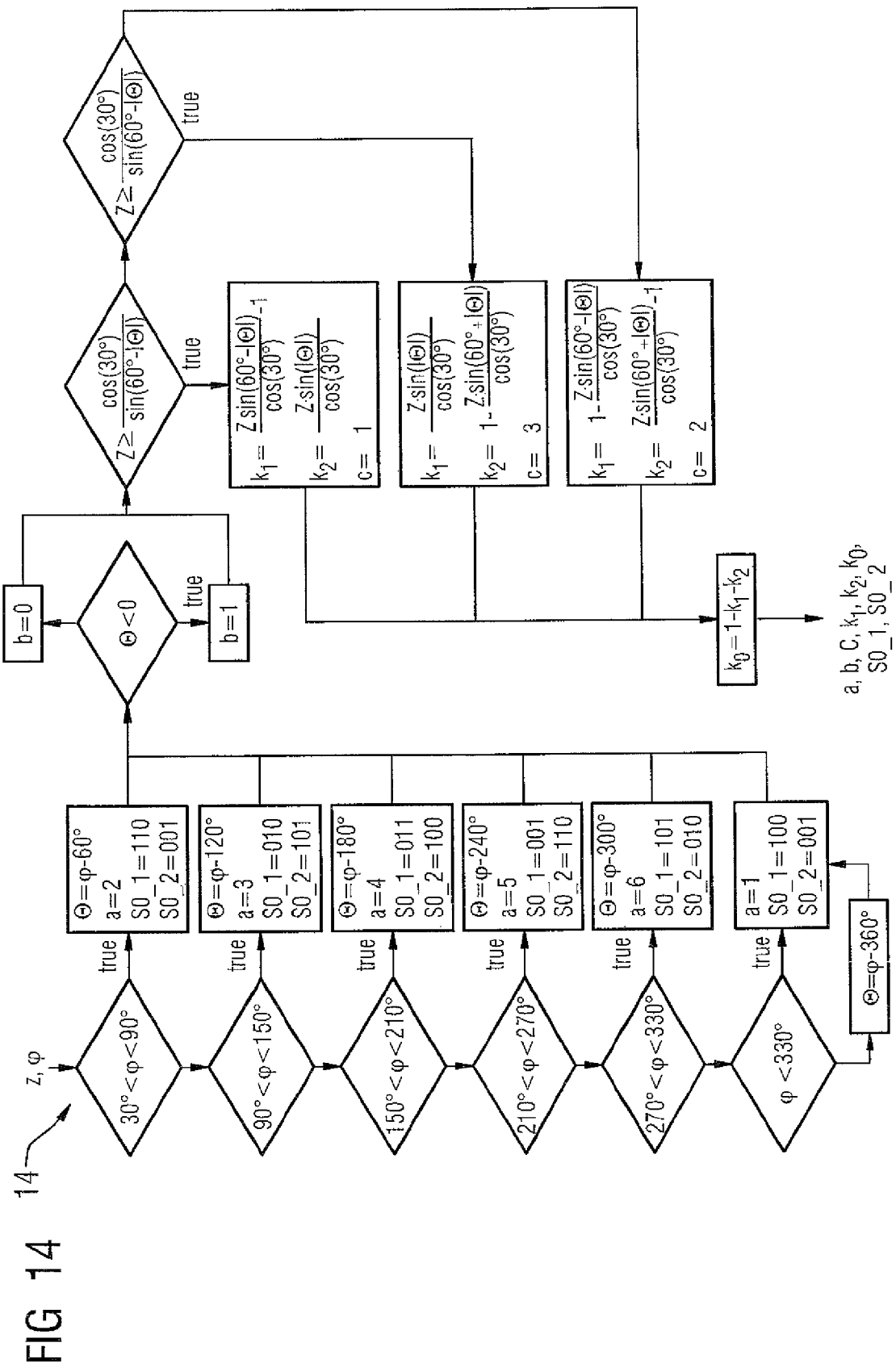
FIG. 14 shows a flow chart diagram the basic principle of the method for controlling a Vienna rectifier proposed here.

The calculations explained above can be combined in a schematically simplified trigger set algorithm 14 shown in FIG. 14—hereinafter sometimes also termed the algorithm 14 or trigger set for short—and implemented in software, firmware or software and firmware in the control system 12.

From left to right, the algorithm 14 comprises the following functions: first the block B1-B6 in which the voltage vector z falls and the angle Θ are determined (see FIG. 6 and associated description). The angle Θ relates—in accordance with the above description—only to the first block B1. The block B1-B6 determined is carried in the variable a. In addition, the two zero vectors associated with the block B1-B6 determined are carried in the variables designated S0_1 and S0_2.

Then, on the basis of the resulting value of the angle Θ, it is determined whether the voltage vector z output by the control system 12 and rotated into the first block B1 falls in the negative or positive half thereof (see FIG. 7 and associated description). The half determined is carried in the variable b.

Figure 12:
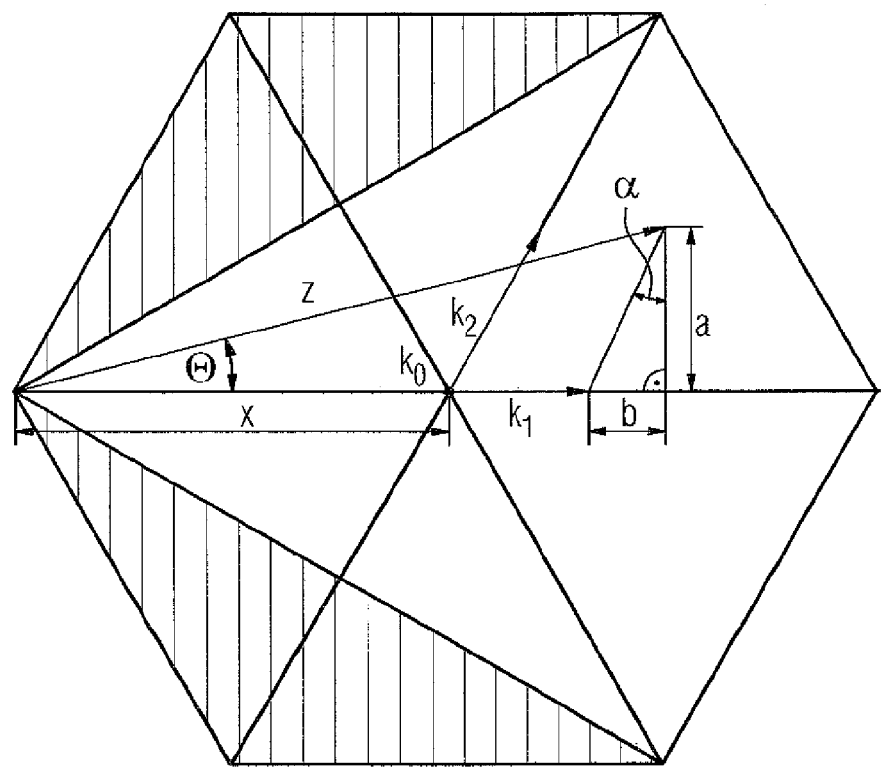
FIG. 12 and FIG. 13 show illustrations clarifying how the respective lengths of the subvectors according to FIG. 9 for forming the voltage vector output by the control system are determined.
Figure 13:
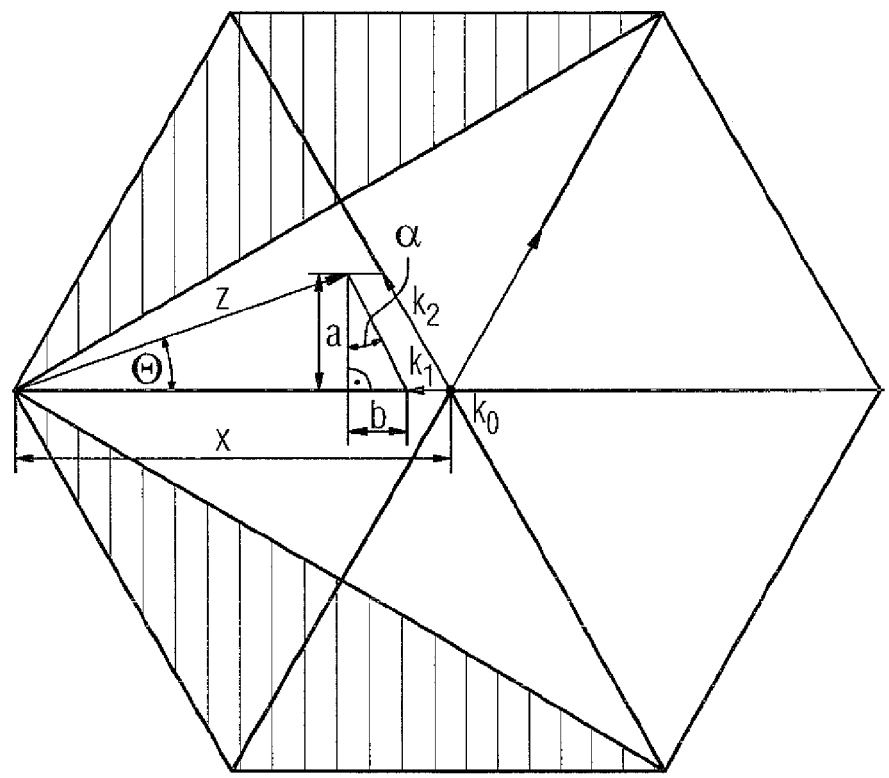

It is further determined (top right in the diagram of the algorithm 14) in which of the area sections F1, F2, F3 of the first block B1 the voltage vector z output and rotated by the control system 12 falls. Depending on the evaluation of the inequalities explained on the basis of the diagrams in FIG. 10 and FIG. 11, different branches are produced within the algorithm 14, wherein the equations relevant for the respective area section F1, F2, F3 and explained on the basis of the diagrams in FIG. 12 and FIG. 13 are used to determine the switching times t1, t2 of the star point switches S1, S2, S3. The area section F1, F2, F3 determined is carried in the form of the variable c. The switching time t0 results from the other switching times t1, t2, irrespective of the particular area section F1, F2, F3.

For triggering the switches S1-S3, the switching time t0 is divided between the two switching states of the zero vector (see above: "The three-level inverter has six zero points each with two zero vectors."): t01, t02. In order to reduce the voltage difference between the two DC-link capacitors C1, C2, the switching times t01, t02, t1, t2 are halved and output in an axially symmetrically mirrored manner within an clock cycle T, as shown by way of example in FIG. 15.

For the embodiment described here, the switches S1-S3 are triggered by means of a PWM stage operated according to the up-down count principle. Said PWM stage constitutes e.g. the output of a control system 12 also incorporating the algorithm 14. In the case of an algorithm 14 implemented in the form of a separate microcontroller or the like, the PWM stage is connected between the microcontroller and the switches S1-S3, with the PWM stage acting as an output of the microcontroller, for example.

Figure 15:
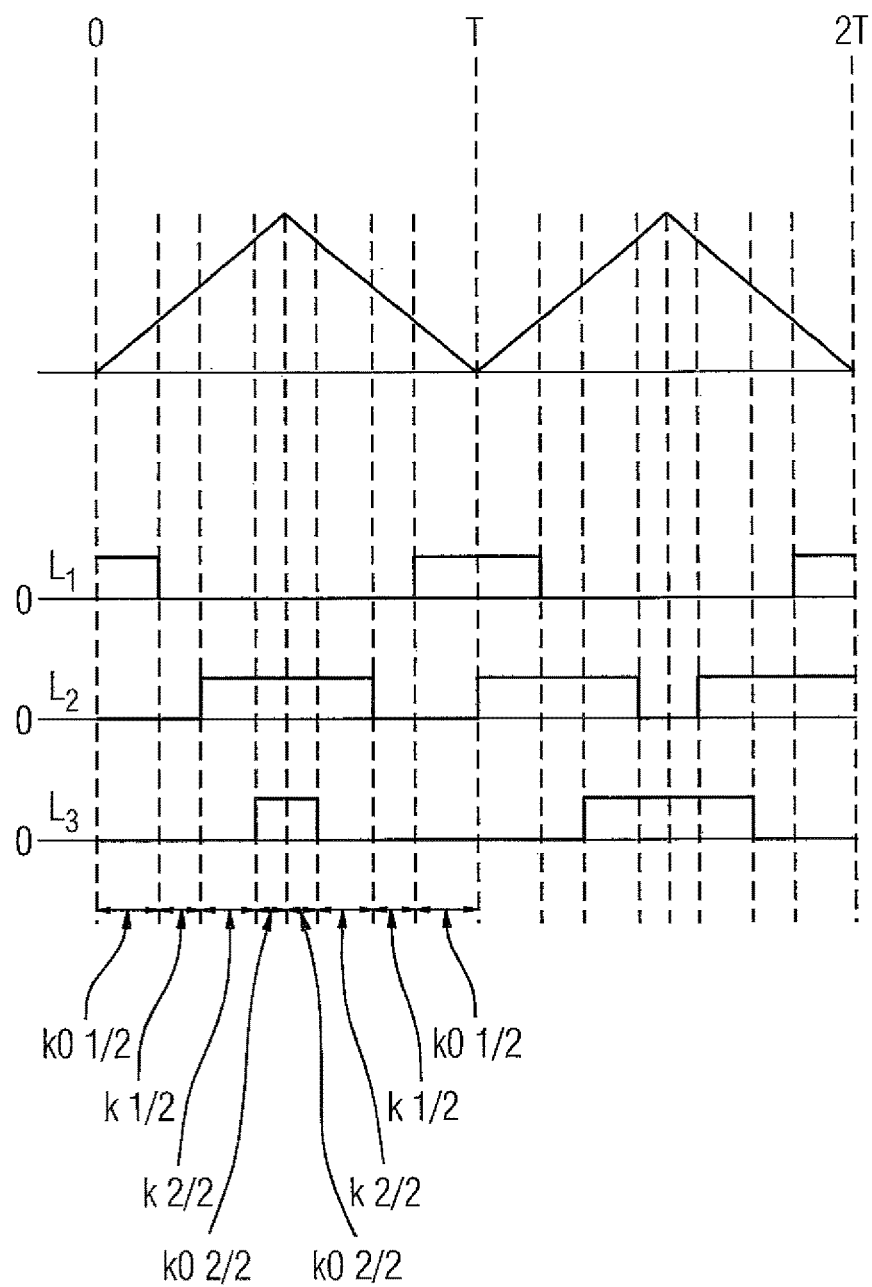
FIG. 15 shows a diagram of individual switching states resulting from application of the proposed method over two clock cycles.
Figure 15:
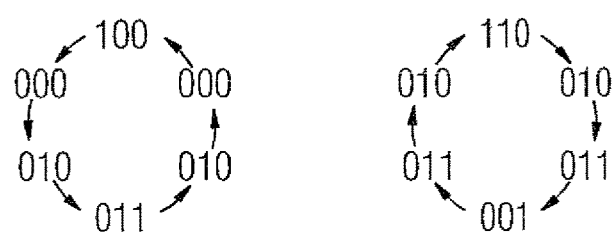

The lower part of the diagram in FIG. 15 shows the three phases L1, L2, L3 and the switching states resulting from the switching times t0, t1, t2. In the upper part, the up-down count principle is shown in the form of a symmetrical triangle. In each clock cycle T, the underlying counter starts with the value "0", is incremented in the first half of the clock cycle T, reaches its maximum in the middle of the clock cycle T, and is decremented in the second half of the clock cycle T so that the counter has reached the value "0" again at the end of the clock cycle T. The respective count is compared with the determined switching times t0, t1, t2 so that, depending on the result of the comparison, the individual switches S1-S3 can be activated or deactivated. To summarize, it can be said that the subvectors k0, k1, k2 for triggering the switches S1-S3 are halved and output in a mirrored manner:

$$k01/2 \to k1/2 \to k2/2 \to k02/2 \to k02/2 \to k2/2 \to k1/2 \to k01/2.$$

The successive switching states are shown below the previously discussed first of the two clock cycles T shown. The switching cycle begins and ends with the switching state "100". In general, each switching cycle ends with the same zero vector/switching state with which the switching cycle began. In order that only one switching state is changed for each switching activity, i.e. just one of the three star point switches S1-S3 is switched in each case, the subvectors k0, k1, k2 are output in a sequence predefined for the algorithm 14 depending on the particular sector of the space vector switching diagram in which the voltage vector z output by the control system 12 falls in each case. The respective sequences (directions of rotation) are illustrated in the diagram in FIG. 16 and the selection of a sector and therefore the selection of the respective direction of rotation takes place on the basis of the variables a, b, c of the algorithm 14 which specify in each case the original block B1-B6, the positive or negative half thereof and one of the three subareas F1-F3.

Figure 16:
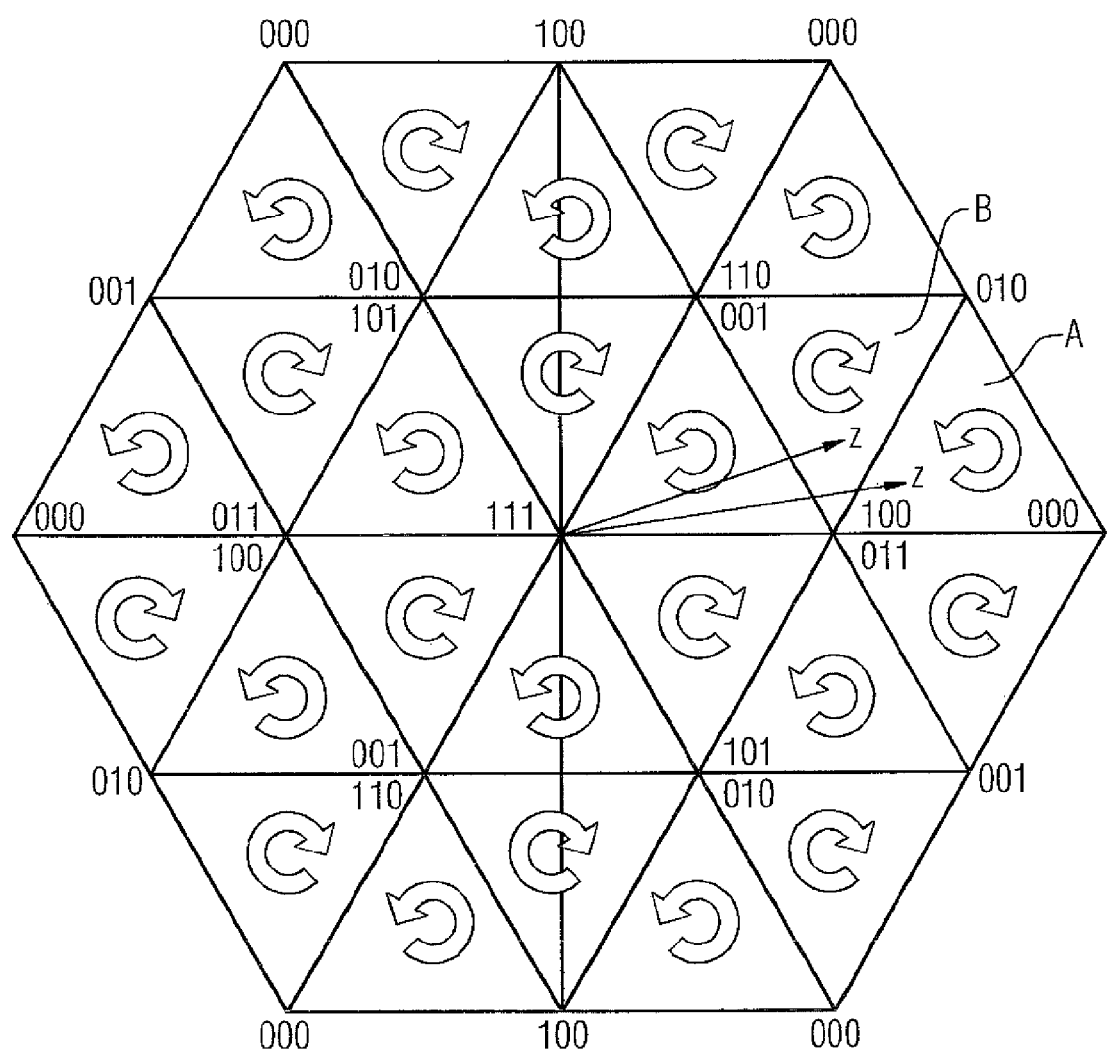
FIG. 16 shows the space vector switching diagram of the Vienna rectifier according to FIG. 3, FIG. 5 with directions of rotation predefined for each sector.

For the purpose of illustration using two voltage vectors z, in FIG. 16 two sectors A, B of the space vector switching diagram having different switching sequences are selected. The representation in the left-hand part of FIG. 15 (first clock cycle T) corresponds to the switching sequence in the first sector A. The representation in the right-hand part of FIG. 15 (second clock cycle T) corresponds to the switching sequence in the second sector B. In the representation in FIG. 15, the resulting switching states are again shown in the lower region in each case. The switching sequence modified according to the sector A, B is also illustrated in this representation. In respect of the switching times t0, t1, t2, what was stated for the clock cycle von [0 . . . T] applies accordingly to the second clock cycle of [T . . . 2T].

Altogether the method presented here is characterized in that the switching times t0, t1, t2 are calculated by the algorithm 14 using extremely simple calculations. This is based first on the normalization of the phase angle φ in the form of the "rotation" into the first block B1, so that irrespective of the actual phase φ of the voltage vector z the geometric ratios in the first block B1 can always be taken as the basis. Said first block B1 is then divided into symmetrical halves, wherein the normalized phase angle ⊖ can be used for the positive half and the absolute value |⊖| thereof for the negative half. For negative or positive normalized phase angles ⊖ it can therefore be determined in the same way into which of three area sections F1, F2, F3 the rotated voltage vector z falls. Depending on the particular area section F1, F2, F3, the switching times t0, t1, t2 are finally determined, wherein, on the basis of the relations introduced above in connection with the explanation of the diagrams in FIG. 12 and FIG. 13, similar or recurring trigonometric terms, e.g. cos(30°) are apparent, so that the calculation is reduced to comparatively simple sine and cosine functions, and the results of individual terms only need to be calculated once, but can be used repeatedly. This shortens the execution time of the algorithm 14 executed cyclically with a particular cycle time, e.g. 4 kHz, so that higher cycle times are possible.

Figure 17:
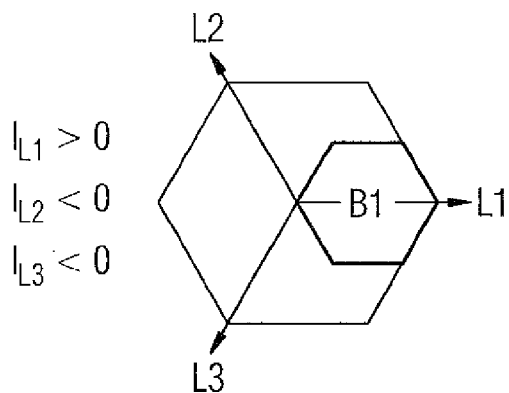
FIG. 17 shows selection of a block as in FIG. 6 on the basis of the phase currents according to an embodiment of the proposed method.
Figure 17:
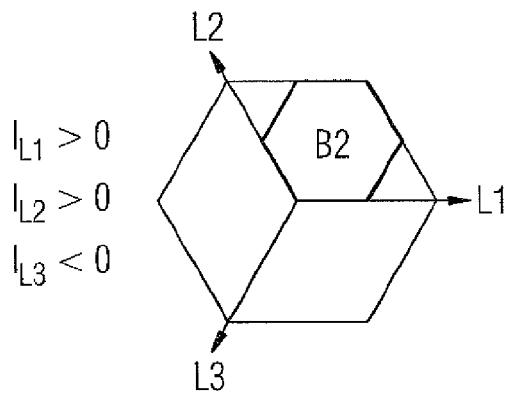
Figure 17:
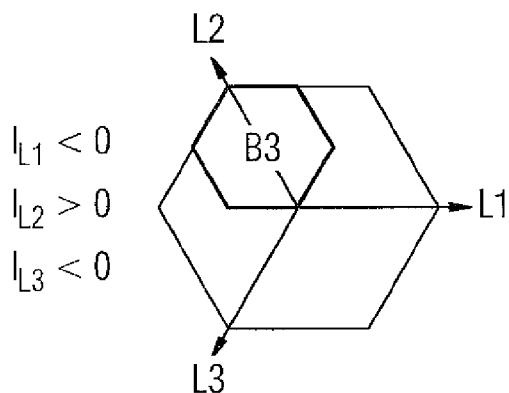
Figure 17:
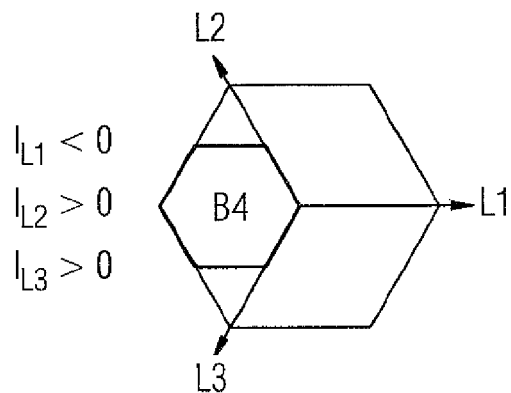
Figure 17:
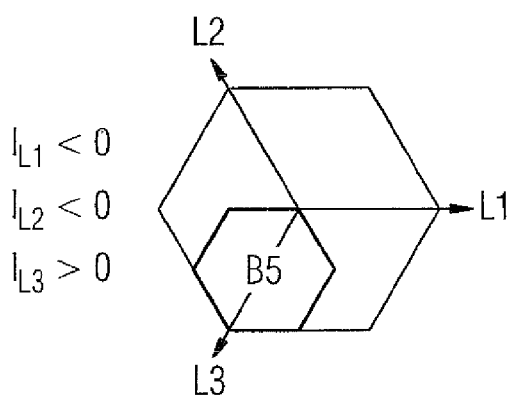
Figure 17:
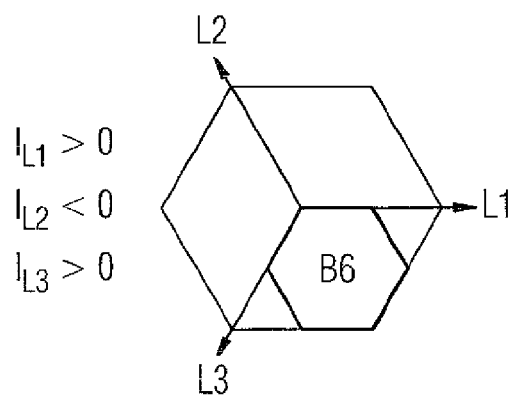

It has hitherto been assumed that one of the six blocks B1-B6 (FIG. 6) of the space vector switching diagram is selected according to the voltage vector z output by the control system 12. In a particular embodiment of the method, selection of one of the six blocks B1-B6 does not takes place on the basis of the voltage vector z, but on the basis of the supplied current, as shown in the diagram in FIG. 17. Here the individual phase currents $I_{L1}$, $I_{L2}$, $I_{L3}$ are considered and in the case of e.g. $I_{L1} > 0$, $I_{L2} < 0$ and $I_{L3} < 0$ the first block B1 is selected by means of an algorithm 14 modified in this respect. The above described offset angle and the normalized phase angle ⊖ are produced according to the block B1-B6 selected on the basis of the phase currents $I_{L1}$, $I_{L2}$, $I_{L3}$.

This takes into account the problem that the Vienna rectifier 10 does not have a controllable switch in each path but only diodes D1-D3; D4-D6 in the upper and lower bridge, so that not all the voltage vectors z can be actively applied. The control system 12 could predefine a voltage vector z which cannot be actively applied, so that another vector is actually applied. This can cause the control of the output voltage U to become unstable.

As the relevant current vector is involved in the selection of one of the blocks B1-B6, further measures must be implemented which force the voltage vector z output by the control system 12—the desired voltage vector z according to the control arrangement—into the block B1-B6 selected. In addition, the "correct" switching states must be selected, as switching states outside a block sector Ba, Bb, Bc (FIG. 18) are not possible and likewise not every switching state within a block sector Ba, Bb, Bc is possible.

Figure 18:
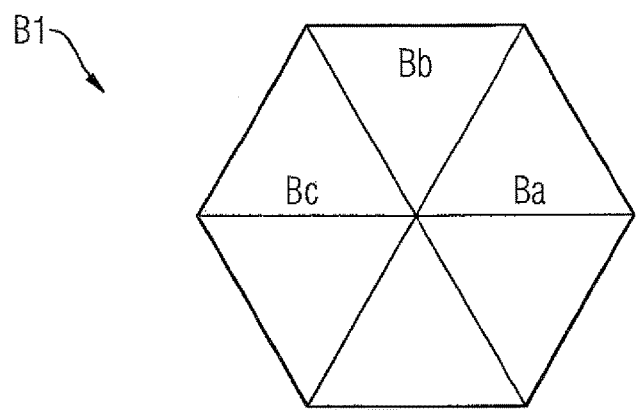
FIG. 18 shows a block according to FIG. 17 subdivided into individual block sectors.

In the diagram in FIG. 18 it is shown that, for that reason, the first block B1 to which each block B1-B6 selected on the basis of the current vector is rotated by a rotation as described above is subdivided into 2× three block sectors Ba, Bb, Bc, wherein, because of the axial symmetry of the block B1, consideration e.g. of the three "upper" block sectors Ba, Bb, Bc is sufficient.

The particular block sector Ba, Bb, Bc is selected e.g. as was explained earlier with reference to the selection of one of the three area sections F1, F2, F3 shown in FIG. 8. However, the scanning is designed such that voltage vectors z outside one of the three block sectors Ba, Bb, Bc according to the respective current vector are also assigned to just one of the three block sectors Ba, Bb, Bc. In the case of a voltage vector z outside one of the three block sectors Ba, Bb, Bc, limiting of the duty factor is required so that a meaningful pulse pattern can be produced.

Figure 19:
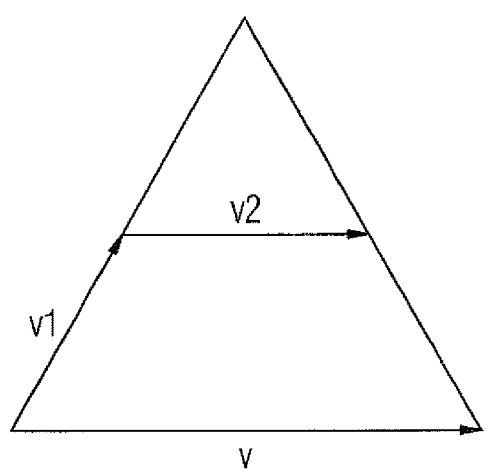
FIG. 19 shows a so-called 60° triangle (equilateral triangle) to illustrate ratios applicable there.

It should first be stated that the three block sectors Ba, Bb, Bc are equilateral triangles, i.e. so-called 60° triangles. In a 60° triangle it is the case that, as shown by way of illustration in FIG. 19, for each first vector v1 running along an edge and an associated vector v2, the sum of the lengths of these two vectors corresponds to the edge length |v| of the triangle: |v1|+|v2|=|v|. This is utilized for shortening the voltage vector z output by the control system 12, said shortening being particularly simple computationally and therefore efficiently implementable in a correspondingly modified algorithm 14. This results in a shortening of a voltage vector initially lying outside one of the three block sectors Ba, Bb, Bc to a boundary of the respective block sector Ba, Bb, Bc.

Figure 20:
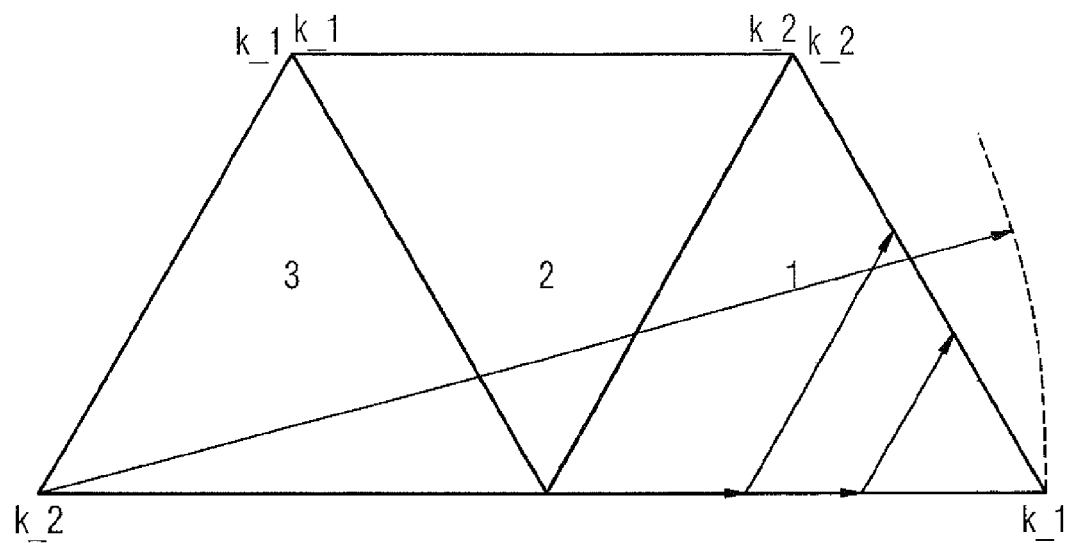
FIG. 20 to FIG. 22 show limiting of the subvectors to one of the block sectors according to FIG. 18 in each case according to an embodiment of the proposed method.
Figure 21:
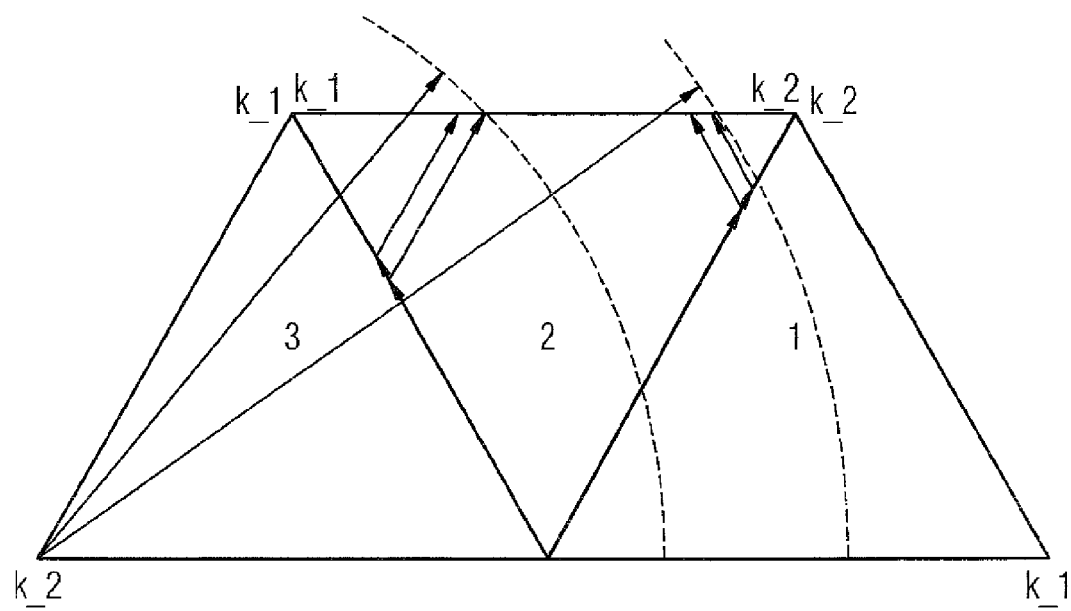
Figure 22:
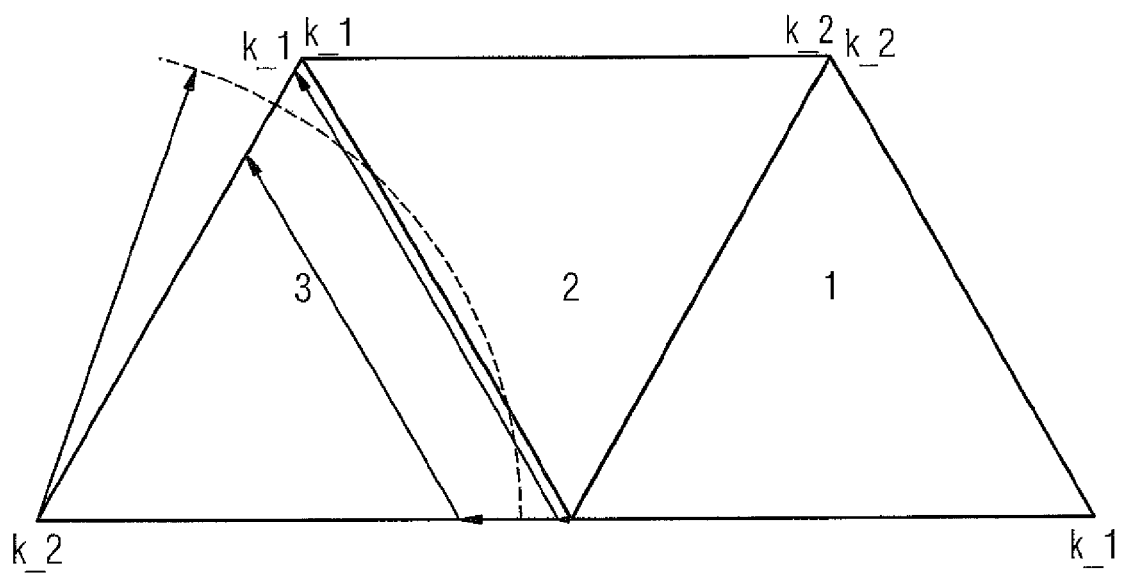

For a voltage vector z lying outside the outer block sector Ba, FIG. 20 shows the limiting thereof to the outer block sector Ba. This takes place in the context of shortening one of the two subvectors k1, k2, namely such that the sum of the duty factors corresponds to the value "1". According to the ratios in a 60° triangle explained on the basis of the diagram in FIG. 19, if k1>k2, the subvector k1 having the larger duty factor can be reduced to k1=1−k2 or the subvector k2 having the smaller duty factor can be reduced to k2=1−k1. Such a shortening of a subvector k1, k2 compared to a basically also possible percentage reduction of both subvectors k1, k2 has the advantage of requiring much less computational effort for executing a correspondingly modified algorithm 14.

In a particular embodiment of the method, for optimized selection of the reduction of either the subvector having the larger duty factor or the subvector having the smaller duty factor, case discrimination on the basis of the respective block sector Ba, Bb, Bc is possible. As control of the Vienna rectifier 10 takes place primarily in the outer block sector Ba and the middle block sector Bb, the error must be at its smallest in this region. Accordingly, for the outer block sector Ba, reduction of the longer subvector preferably takes place. Another reduction of the shorter subvector takes place in the middle block sector Bb.

For subvector reductions, the control system 12 must be given a notification so that the integral action components of the controller can be limited. This avoids overcontrolling after a sector change.

Figure 23:
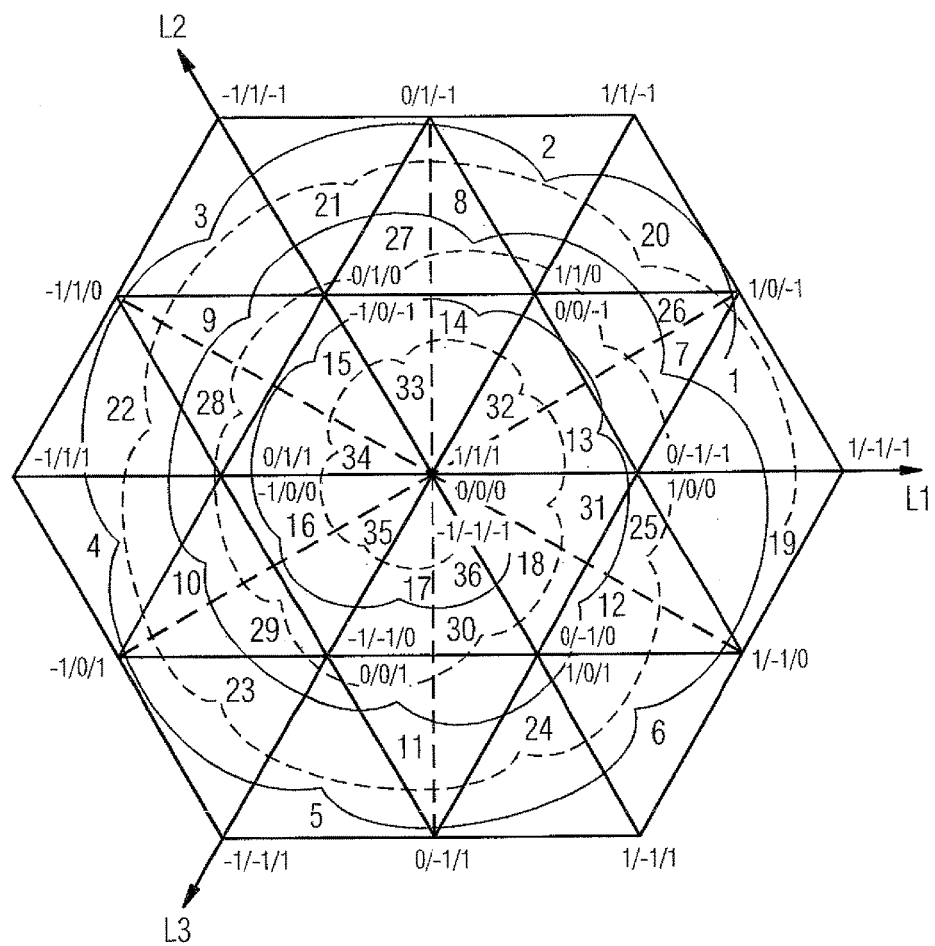
FIG. 23 shows numbering of the sectors of the space vector switching diagram for specifying the direction of rotation, said numbering being predefined for an embodiment of the proposed method.

For a particularly simple means, within a modified algorithm 14, of selecting the direction of rotation (cf. FIG. 16), numbering of the sectors of the space vector switching diagram is provided, as shown in the diagram in FIG. 23. The illustrative connection of the sectors according to the predefined numbering reveals two spirals. The predefined numbering sequence shown in FIG. 23 is accordingly also termed the double spiral numbering sequence.

The direction of rotation is determined on the basis of the current vector by selecting one of the sectors numbered 1 to 36 according to the double spiral numbering sequence, wherein the increased number of sectors (36 sectors compared to 24 sectors according to the space vector switching diagram in FIG. 3, FIG. 5) results from the symmetrical division of the sectors at 30°, 90°, 150°, 210° etc.

First, as a starting point, an initial numerical value s is determined on the basis of the current vector and the phase currents $I_{L1}$, $I_{L2}$, $I_{L3}$:

| | | | |
|---|---|---|---|
| $I_{L1} \geq 0 \Rightarrow$ | $I_{L2} \geq 0 \Rightarrow$ | | s = 1 (sector 2) |
| | $I_{L2} < 0 \Rightarrow$ | $I_{L3} \geq 0 \Rightarrow$ | s = 5 (sector 6) |
| | | $I_{L3} < 0 \Rightarrow$ | s = 0 (sector 1) |
| $I_{L1} < 0 \Rightarrow$ | $I_{L2} \geq 0 \Rightarrow$ | $I_{L3} \geq 0$ | s = 3 (sector 4) |
| | | $I_{L3} < 0 \Rightarrow$ | s = 2 (sector 3) |
| | $I_{L2} < 0 \Rightarrow$ | | s = 4 (sector 5) |

Using the value s thus determined, case discrimination takes place to establish whether the rotation-normalized phase angle $\ominus$ is greater or less than 0°. For $\ominus<0°$, the value "18" is added to the initially determined value s (s=s+18). For $\ominus\geq0°$, it remains at the value s. On the basis of the block sector Ba, Bb, Bc in which the voltage vector z output by the control system 12 falls, a constant dependent on the respective block sector Ba, Bb, Bc is added to the previously obtained numerical value s. In the case of a voltage vector z falling in the outer block sector Ba, the value "1" is added (s=s+1), in the case of a voltage vector z falling in the middle block sector Ba, the value "7" (s=s+7) is added, and in the case of a voltage vector z falling in the inner block sector Bc, the value "13" (s=s+13) is added. On the basis of the resulting numerical value s, just one sector is produced according to the numbering of the sectors in the space vector switching diagram and the direction of rotation defined for that sector (see FIG. 16) is used for the switching sequence. The described determination of the numerical value s is part of the modified algorithm 14. The switching sequence defined for the individual sectors is likewise part of the modified algorithm 14 and a possible implementation consists in that, using the numerical value s determined, a jump to a position within the modified algorithm 14 is initiated and that there the switches S1-S3 to be activated or deactivated and the switching times t0, t1, t2 are concretely specified, as given below in pseudocode:

```
CASE s OF
    1:      (* switching state for sector 1 *)
    ...
            (* switching times for sector 1 *)
    ...
    13:     (* switching state for sector 13 *)
    ...
            (* switching times for sector 13 *)
    ...
    36:     (* switching state for sector 36 *)
    ...
            (* switching times for sector 36 *)
    ..
END
```

Another particular and basically optional embodiment of the method provides additional balancing of the DC-link voltage. For this purpose the individual voltages dropped across the two DC-link capacitors C1, C2 are detected and fed to a controller, in particular a PI controller, e.g. a controller incorporated in the control system 12. This controller's output acts on the switching times t0, t1, t2 determined and varies the ratios of the switching times t01, t02 resulting from the two zero vectors k01, k02. This is based on the fact that during operation of the Vienna rectifier 10 over a comparatively long period, i.e. at least over a plurality of clock cycles T, for the halved zero vector k01, k02 described above, if k02>k01, the voltage dropped across the first DC-link capacitor C1 increases and the voltage dropped across the second DC-link capacitor C2 accordingly reduces, whereas, if k02<k01, the voltage dropped across the first DC-link capacitor C1 reduces and the voltage dropped across the second DC-link capacitor C2 increases. By means of the controller (balancing controller), the ratio of the two zero vectors k01, k02 is varied such that the individual voltages dropped across the two DC-link capacitors C1, C2 are the same or at least essentially the same. Within each clock cycle T, the star point S would be on average at zero current.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for controlling a Vienna rectifier having three controllable switches, the method comprising:
   based on a characteristic vector, selecting a block from a plurality of blocks in a space vector switching diagram for the Vienna rectifier,
   depending on the selected block and a position of the selected block in the space vector switching diagram, rotating the vector by an offset angle in accordance with the position of the selected block in the space vector switching diagram,
   using the resulting angle of the rotated vector as a normalized phase angle and designating the selected block in which the rotated vector falls as a first block,
   based on the normalized phase angle, selecting an upper half or a lower half of the first block,
   based on an absolute value of the normalized phase angle and of the vector, selecting in the first block one of three area sections of the first block,
   based on the selected area section, determining three subvectors which, when added together, correspond to the rotated vector,
   based on the determined subvectors, determining a respective switching time for each of the three determined subvectors, and
   triggering the three controllable switches at the respective switching times.

2. The method of claim 1, further comprising:
   defining for each sector of the space vector switching diagram a direction of rotation, and
   selecting, for selecting a direction of rotation for triggering the controllable switches in a particular block in which the characteristic vector falls, one of three sectors in accordance with to the space vector switching diagram that depend on the upper or lower half selected in the first block and the area section selected in the first block.

3. The method of claim 1, further comprising:
   halving a switching time of a zero vector, and
   triggering one of the switches at a start and an end of each clock cycle in accordance with the halved switching time.

4. The method of claim 1, further comprising:
   halving the switching times, and
   distributing the halved switching times in a first order over a first half of each clock cycle, and
   distributing the halved switching times in a second order that is inversed from the first order, over a second half of the respective clock cycle.

5. The method of claim 1, wherein the characteristic vector is a voltage vector outputted by a control system.

6. The method of claim 1, wherein the characteristic vector is a current vector from a power grid supplying the Vienna rectifier.

7. The method of claim 6, wherein the determined subvectors are limited to an area of an outer, middle or inner block sector, depending on the particular block sector in which the rotated vector falls.

8. The method of claim 7, further comprising:
   defining for each sector of the space vector switching diagram at least one direction of rotation,
   numbering, for selecting a particular direction of rotation for triggering the switches, the block sectors of the space vector switching diagram in accordance with a predefined numbering sequence, and
   selecting one of the block sectors and the direction of rotation defined for the one block sector in accordance with a predetermined numerical value for the block in which the characteristic vector falls, to which depending on the mathematical sign of the normalized phase angle, a predefined first or second summand is added, and depending on the respective block sector, a third, fourth or fifth summand is added.

9. The method of claim 1, further comprising:
   for balancing a DC-link voltage of the Vienna rectifier that can be tapped at an output side via two series-connected DC-link capacitors, determining a voltage drop across each DC-link capacitor,
   supplying voltage values corresponding to each voltage drop to a controller, and
   controlling with the controller the switching times.

10. The method of claim 9, wherein one of the controlled switching times is the switching time of a subvector corresponding to a zero vector.

11. A computer program comprising program code stored on a non-transitory computer-readable medium, which program code when read into a memory of a control system configured to control a Vienna rectifier and executed by the control system, causes the control system to:
   based on a characteristic vector, select a block from a plurality of blocks in a space vector switching diagram for the Vienna rectifier,
   depending on the selected block and a position of the selected block in the space vector switching diagram, rotate the vector by an offset angle in accordance with the position of the selected block in the space vector switching diagram,
   use the resulting angle of the rotated vector as a normalized phase angle and designating the selected block in which the rotated vector falls as a first block,
   based on the normalized phase angle, select an upper half or a lower half of the first block,
   based on an absolute value of the normalized phase angle and of the vector, select in the first block one of three area sections of the first block,
   based on the selected area section, determine three subvectors which, when added together, correspond to the rotated vector,
   based on the three determined subvectors, determine a respective switching time for each of the three determined subvectors, and
   triggering the three controllable switches at the respective switching times.

* * * * *